Figure 1:
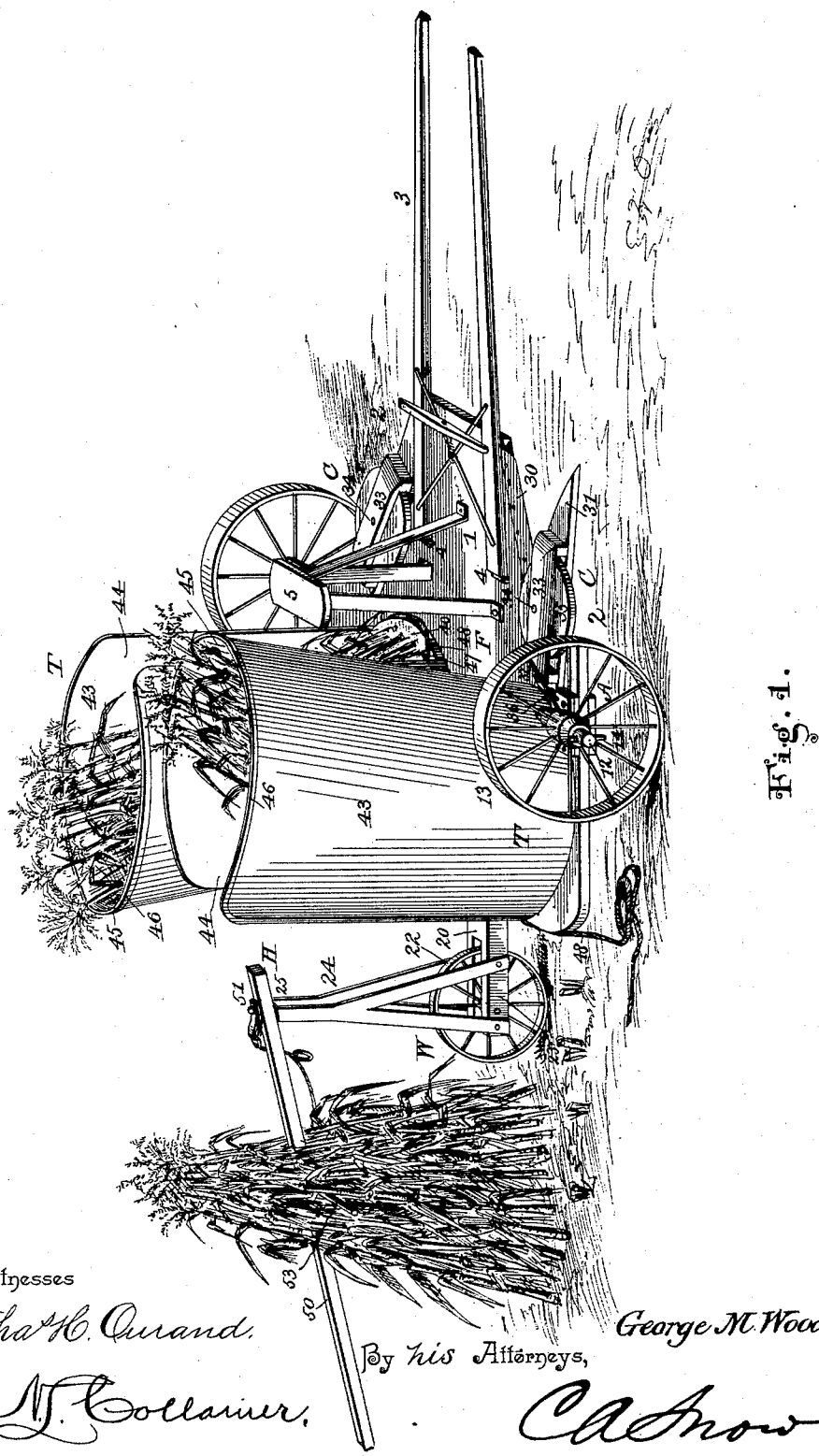

(No Model.) 2 Sheets—Sheet 1.

G. M. WOODRUFF.
CORN HARVESTER.

No. 483,755. Patented Oct. 4, 1892.

Witnesses
Chas. H. Ourand.
N. Collamer.

Inventor
George M. Woodruff,
By his Attorneys,
C. A. Snow & Co.

(No Model.) 2 Sheets—Sheet 2.
G. M. WOODRUFF.
CORN HARVESTER.
No. 483,755. Patented Oct. 4, 1892.
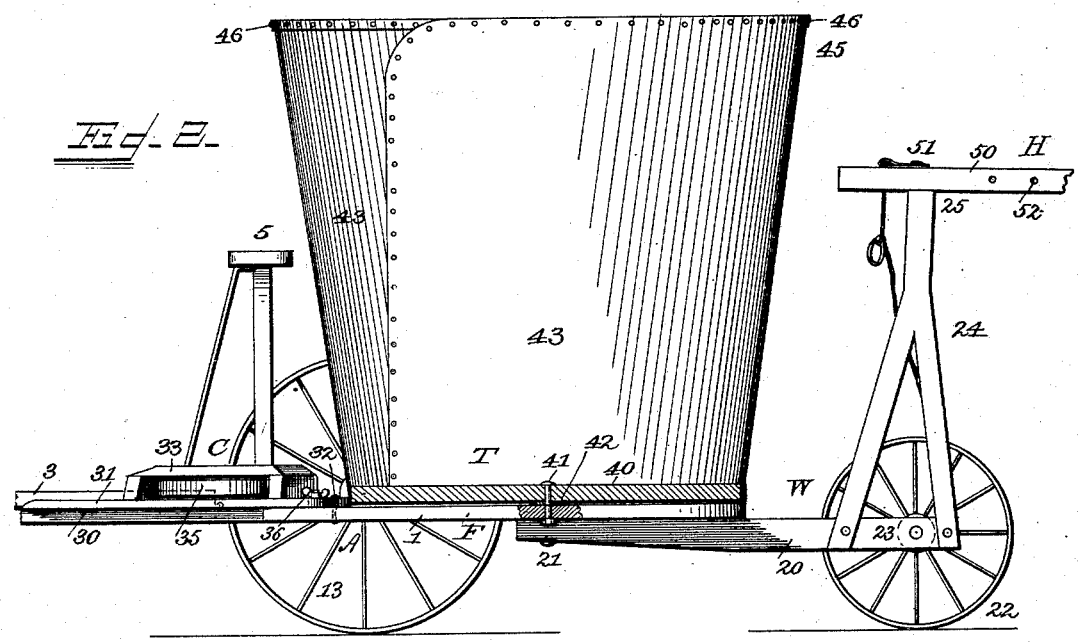
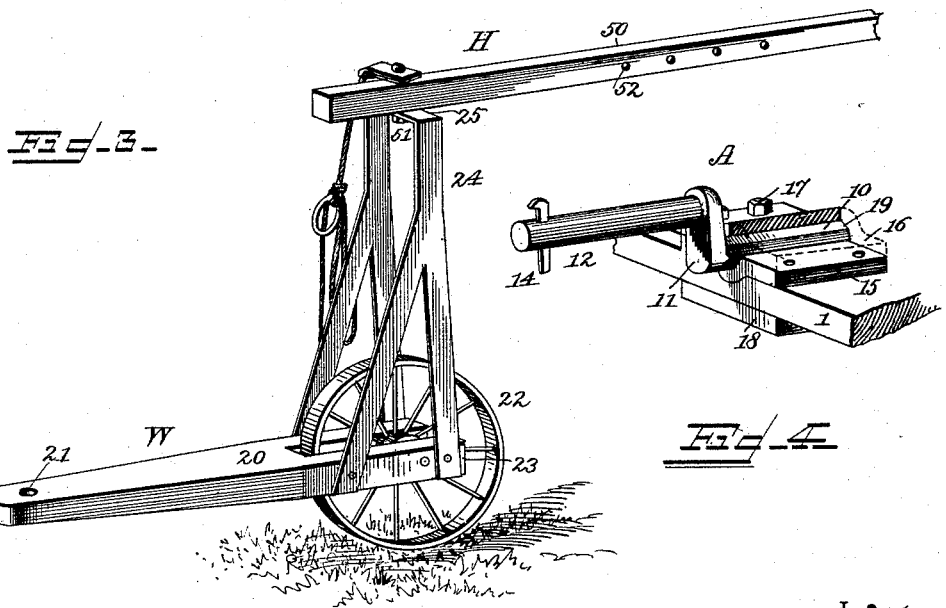
Witnesses
Chas. H. Durand
N. J. Collamer
Inventor
George M. Woodruff,
By his Attorneys,
C. A. Snow & Co.

UNITED STATES PATENT OFFICE.

GEORGE M. WOODRUFF, OF COLONY, KANSAS.

CORN-HARVESTER.

SPECIFICATION forming part of Letters Patent No. 483,755, dated October 4, 1892.

Application filed December 18, 1891. Serial No. 415,525. (No model.)

*To all whom it may concern:*

Be it known that I, GEORGE M. WOODRUFF, a citizen of the United States, residing at Colony, in the county of Anderson and State of Kansas, have invented a new and useful Corn-Harvester, of which the following is a specification.

This invention relates to harvesters of that class adapted for cutting corn and binding it by hand; and the object of the same is to produce certain improvements in devices of this character.

To this end the invention consists in the details of construction hereinafter more fully described and claimed, and as illustrated on the accompanying two sheets of drawings, wherein—

Figure 1 is a perspective view of this machine, showing one cutting apparatus as closed and one pivoted table turned to the rear and also showing the use of the head-guide. Fig. 2 is a side elevation of the machine with the nearer supporting-wheel removed and the nearer pivoted table in section. Fig. 3 is a perspective detail of the caster-wheel and its frame and of the head-guide with its cross-bar removed. Fig. 4 is an enlarged perspective detail of one of the stub-axles and adjusting devices.

This machine comprises a main framework F, to which are adjustably secured stub-axles A, carrying the supporting-wheels, while a caster-wheel W supports the rear of the framework, pivoted tables T, mounted on the framework, cutting apparatus C, forward of said tables, and a head-guide H, supported by the caster-wheel, the various parts being of the following specific construction.

The framework F comprises a large flat platform 1, having cut-away front corners 2, and the thills 3 are connected at 4 to the platform, while a driver's seat 5 is preferably supported thereby behind the thills. This platform is of wood or other light material and may be solid or only a skeleton framework.

The stub-axles A each consist of an octagonal bar 10, having at its outer end an elbow 11, from which projects the spindle 12, whereon is journaled the hub of the wheel 13, which is held in place by a pin or nut 14. 15 is the lower member of a socket or clip which is countersunk into the platform 1, and 16 is the upper member thereof, bolts 17 passing down through the members, through the platform 1, and through a brace or fish plate 18 beneath the platform. The recess 19 between the meeting faces of the members 15 and 16 is octagonal, so as to receive the octagonal bar 10, which is tightly clamped therein by the bolts. One of these axles is mounted at each front corner of the framework, and when it is desired to adjust the height of the latter the bolts are loosened and the bars 10 are turned in the sockets, so that the elbows 11 shall project at other angles from the bars 10, which will bring the spindles 12 into different vertical positions, and the socket members again tightened on the bars. The spindles will thus hold the wheels, or, rather, the wheels will hold the bars 10, at different heights, and hence the framework will be adjusted vertically. The wheels are preferably spaced so as to allow the machine to cut two rows of corn at once, the horse traveling between the rows.

The caster-wheel W comprises a body 20, pivoted at 21 beneath the framework, a wheel 22, mounted on a horizontal axis in the bifurcated rear end 23 of said body, and a light and preferably metallic yoke 24, rising from the body and connected across its upper end at 25 at a considerable height above the wheel. Thus as the machine is drawn over the ground the caster-wheel trails behind and supports the rear edge of the framework, the body 20 turning on the pivot 21 in a manner which will be clear.

The cutting apparatus C of this improved corn-harvester is constructed as follows: 30 is an inclined stationary knife carried by the framework F at each front corner thereof, about as shown. 31 is a finger pivoted at 32 to the framework adjacent the rear end of the knife, and in a bracket 33, carried by this finger, is mounted on a vertical pivot 34 a wheel 35. The finger 31 is so placed that when it is not desired to use the machine the whole finger can be swung over the knife 30, as seen at the left side of the machine in Fig. 1; but at other times the finger stands at an angle to the longitudinal line of the machine, and as the latter progresses the stalks pass between the tip of the finger and the knife and are borne by the wheel against the edge of the knife, the bodies of the stalks being meanwhile properly inclined to facilitate their bundling. 36 is a set-screw through the heel of the finger, bearing on the platform 1, and when the finger is set to the desired angle this screw is tightened to hold it in that position. Any other form of adjusting device can, however, be used.

The pivoted tables T, of which there are two, are each of the following construction: 40 is the bed of the table, which is of circular shape and which is centrally pivoted on a vertical bolt 41 to the framework, a washer 42 being preferably interposed between the bed and the framework. Secured to the periphery of this bed is what I will call the "retaining-shield," which is a strong but light piece of sheet metal 43, open at its front, as at 44, curved around above the edge of the bed, to which it is secured, and inclining to the rear, as at 45, at the back—that is, at a point opposite its open front. Around the upper edge of each shield I preferably bolt or secure a metallic strap 46, and other straps may be arranged to stiffen the whole. Secured to the bed at the point 47 is a stout cord or rope 48, that leads around the front edge of the bed, past the mouth, to the side of the framework.

The head-guide H comprises a long bar 50, pivoted at 51 to the upper end 25 of the yoke which is carried by the caster-wheel, and through one of a number of holes 52 in this bar passes a transverse rod 53, which stands horizontal and is capable of being withdrawn laterally, the bar and the rod thus forming a cross-shaped head-guide supported at a point above the ground slightly below the line which the heads of the cut-off stalks would reach.

With the above construction of parts a horse is hitched to the thills and directed between the two rows of corn, the fingers 31 being set at such angles that the rows will be passed into the cutting apparatus. The stalks are thereby cut near the ground and they fall to the rear onto the tables T and into the retaining-shields through the open fronts 44 thereof. When one shield has become filled, or, in fact, when both shields are filled, other operators than the driver grasp the ropes 48 and draw on them, thereby turning the tables, as seen at the right side of the machine shown in Fig. 1. The accumulated stalks are then taken by the operators out of the shield and piled around the cross-shaped head-guide to form a shock, as shown in Fig. 1. A cord or twine is then passed around the shock, drawn tight, and tied. The rod 53 is withdrawn from the bar 50 and completely out of the shock, the tables are turned back to their original position, and the machine is started on. The bar 50 draws through the shock and the other operator replaces the rod 53 in one of the holes 52. A boy may sit upon the seat 5 to drive the horse, or he may be driven by one of the operators mentioned and left standing while the men are busy forming the shock and tying the same.

The cutting apparatus herein described and shown is especially advantageous in that it cuts the stalks and directs them into the retaining-guard, the point of the finger will pick up the listed stalks, and the entire finger can be turned over the knife when not in use, so as to prevent persons or animals from accidental cutting thereon.

I consider the retaining-shields herein described superior to similar devices heretofore made to my knowledge, because when the shield is of solid sheet-metal the wind will not blow the stalks off the table or out of position within the shield, and thereby clog the machine, as is so often the case with retaining arms or devices which are not solid like mine.

What is claimed as new is—

1. In a harvester, a cutting apparatus consisting of a stationary knife supported obliquely by the framework, a finger pivoted at its rear end to the framework on a plane above the knife, and a set-screw for locking the finger in adjusted position, as and for the purpose set forth.

2. In a harvester, a cutting apparatus consisting of a stationary knife supported obliquely by the framework, a finger pivoted at its rear end to the framework on a plane above the knife, means for locking the finger in adjusted position, and a wheel pivoted to the finger and moving over the knife, as and for the purpose set forth.

3. In a harvester, the combination, with the main framework and the cutting apparatus thereon, of stub-axles, each comprising a bar having an elbow in its body with a spindle at its outer end, a main wheel journaled on said spindle, and a divided clip on the framework for receiving the axle, and means for locking the clamping-sections of the clip upon the axle, as and for the purpose set forth.

4. In a harvester, the combination, with the main framework and the cutting apparatus thereon, of stub-axles, each comprising a bar polygonal in cross-section, an elbow at the outer end thereof, a spindle projecting outward from the elbow, a main wheel journaled on the spindle, and a two-part clip on the framework, having an octagonal interior detachably engaging said body, as and for the purpose set forth.

5. In a harvester, the combination, with the main framework and the cutting apparatus thereon, of stub-axles, each comprising a bar of octagonal cross-section, an elbow at its outer end, a spindle projecting outward from the elbow, a supporting-wheel journaled on the spindle, and a two-part clip whose lower member is countersunk in the framework and whose upper member stands above, the recessed meeting faces of the members fitting closely on said octagonal body, a fish-plate below the platform, and bolts passing through the ends of the members, the platform, and the fish-plate, as and for the purpose set forth.

6. In a corn-harvester, the combination, with the main framework and cutting apparatus at the front corners thereof, of tables carried by and pivotally connected with said framework and retaining-shields normally standing above the rear edges of the tables, substantially as described.

7. In a corn-harvester, the combination, with a main framework and a cutting apparatus thereon, of a table comprising a circular bed centrally pivoted on the framework in rear of the cutting apparatus and a curved retaining-shield rising from the bed at its edge and open at one side, substantially as described.

8. In a corn-harvester, the combination, with a main framework and a cutting apparatus thereon, of a table comprising a circular bed centrally pivoted on the framework in rear of the cutting apparatus, a curved sheet-metal retaining-shield rising from the edge of the bed and open at one side to form a mouth, and a rope secured to the bed at one side of the mouth and leading across the mouth to the other side of the machine, as and for the purpose set forth.

9. In a corn-harvester, the combination, with the main framework and a cutting apparatus thereon, of a table comprising an approximately-circular bed centrally pivoted on the framework in rear of said apparatus, a solid sheet-metal retaining-shield rising from the bed, open at one side to form a mouth, and inclining to the rear at the opposite side, and means, substantially as described, for turning said table on its pivot, as and for the purpose set forth.

In testimony that I claim the foregoing as my own I have hereto affixed my signature in the presence of two witnesses.

GEORGE M. WOODRUFF.

Witnesses:
E. D. THOMAS,
J. B. RHODES.